(12) United States Patent
Kolesnikov

(10) Patent No.: US 8,296,836 B2
(45) Date of Patent: Oct. 23, 2012

(54) SECURE MULTI-USER IDENTITY MODULE KEY EXCHANGE

(75) Inventor: Vladimir Y. Kolesnikov, Jersey City, NJ (US)

(73) Assignee: Alcatel Lucent, Paris (FR)

( * ) Notice: Subject to any disclaimer, the term of this patent is extended or adjusted under 35 U.S.C. 154(b) by 345 days.

(21) Appl. No.: 12/655,706

(22) Filed: Jan. 6, 2010

(65) Prior Publication Data

US 2011/0167272 A1 Jul. 7, 2011

(51) Int. Cl.
*G06F 7/04* (2006.01)
*G06F 15/16* (2006.01)
*G06F 17/30* (2006.01)
*H04L 29/06* (2006.01)

(52) U.S. Cl. ............................................. 726/9
(58) Field of Classification Search .................. None
See application file for complete search history.

(56) References Cited

U.S. PATENT DOCUMENTS

| | | | |
|---|---|---|---|
| 7,626,963 B2* | 12/2009 | Patel et al. ................... 370/331 |
| 2005/0100165 A1 | 5/2005 | Rose et al. |
| 2005/0138355 A1* | 6/2005 | Chen et al. ................... 713/155 |
| 2006/0206710 A1* | 9/2006 | Gehrmann ..................... 713/168 |
| 2006/0291660 A1* | 12/2006 | Gehrmann et al. ........... 380/277 |
| 2009/0089583 A1* | 4/2009 | Patel ............................. 713/171 |
| 2009/0093249 A1* | 4/2009 | Zhu et al. ...................... 455/433 |
| 2009/0172397 A1 | 7/2009 | Kim |
| 2010/0111308 A1* | 5/2010 | Forsberg et al. .............. 380/278 |
| 2010/0332829 A1* | 12/2010 | Baroffio ......................... 713/168 |

OTHER PUBLICATIONS

Arkko Erricsson, H Haverinen Nokia J; Extensible Authentication Protocol Method for 3rd Generation Authentication and Key Agreement (EAP-AKA); IETF Standard.
Arkko Erricsson, H Haverinen Nokia J; Extensible Authentication Protocol Method for 3rd Generation Authentication and Key Agreement (EAP-AKA); IETF Standard, Jan. 2006.
Internet Engineering Task Force, IETF, CH; Jan. 1, 2006; XP015054876, ISSN: 0000-0003; pp. 4-14.

* cited by examiner

*Primary Examiner* — Brandon Hoffman
*Assistant Examiner* — Carlos Amorin
(74) *Attorney, Agent, or Firm* — Carmen Patti Law Group, LLC

(57) ABSTRACT

An apparatus in one example, where the apparatus comprises a communication device component that performs an authentication key agreement protocol by receiving a first random nonce (RAND) and an authentication token, wherein the communication device component is configured with a shared secret key. The communication device component generates a derivation key by applying a pseudo random function to the RAND and the shared secret key. The communication device component generates a first set of session keys based on a second random nonce (RANDC) and the derivation key where the first set of session keys are used in encrypting communications.

19 Claims, 5 Drawing Sheets

US 8,296,836 B2

SECURE MULTI-USER IDENTITY MODULE KEY EXCHANGE

TECHNICAL FIELD

The invention relates generally to authentication and secure key agreement in authenticating a communication device and more particularly to an extensible authentication protocol (EAP)-authentication and key agreement (AKA) when subscribers use multiple user identify modules.

BACKGROUND

The need to provide secure transactions in the telecommunications industry is well accepted. If service providers are unable to provide a system that supports secure transactions, subscribers will not use wireless devices to make purchases or conduct any other business that must be performed securely. Thus, the telecommunications industry continually tries to provide a secure environment where subscribers may conduct personal and business transactions securely. For example, it is known that the Universal Mobile Telecommunications System (UMTS) standards provide for an authentication key agreement (AKA) and extensible authentication protocol (EAP)-AKA.

In AKA and EAP-AKA a communication device is authenticated using a shared secret key. The shared secret key may reside on a user identity module (UIM) that is part of the communication device. The communication device and a server residing in the network may compute other various keys using the secret key to ensure a secure communication link between the communication device and an access network. This paradigm works well when there is only one UIM.

Subscribers, however, typically have more than one communication device. For example, a subscriber may have a cell phone, a personal digital assistant, a laptop and other communications devices. Each of these devices may receive wireless service through an access network. Also, each one of these devices needs to be authenticated to provide a secure transaction. An efficient way to support a subscriber with multiple communications devices is to give the subscriber a UIM card for each device the subscriber owns, where each UIM card has the same shared secret key. If, however, a subscriber has multiple UIMs, a security hole opens in the AKA and EAP-AKA protocol. If a service provider wants to provide secure communication links and allow a subscriber to have multiple UIM cards with the same shared secret key, the security hole associated with having multiple UIM cards must be addressed.

SUMMARY

In one embodiment there is provided an apparatus. The apparatus comprises a communication device component that performs an authentication key agreement protocol by receiving a first random nonce (RAND) and an authentication token, wherein the communication device component is configured with a shared secret key. The communication device component generates a derivation key by applying a pseudo random function to the RAND and the shared secret key. The communication device component generates a first set of session keys based on a second random nonce (RANDC) and the derivation key where the first set of session keys are used in encrypting communications.

In another embodiment there is provided an apparatus. Where the apparatus is configured to receive a response and a first random nonce (RANDC). The apparatus is also configured to retrieve a derivation key based on a client identifier, and compute an expected response from the derivation key and the RANDC. Still further, the apparatus compares the response with an expected response and if the response equals the expected response, derives a first set of session keys, where the first set of session keys are used in conjunction with a second set of session keys to perform encrypted communications.

A further embodiment provides for a method. The method comprises receiving an authentication vector comprising a first random nonce (RAND), a first derivation key and an authentication token. The method also comprises communicating an authentication request message where the authentication request message comprises the RAND and an authentication token, and receiving a second random nonce (RANDC) and a response. The method further comprises deriving a first set of session keys based on the RANDC, and the first derivation key, where the first set of session keys is used to encrypt communications.

DESCRIPTION OF THE DRAWINGS

Features of example implementations of the invention will become apparent from the description, the claims, and the accompanying drawings in which:

DETAILED DESCRIPTION

Figure 1:
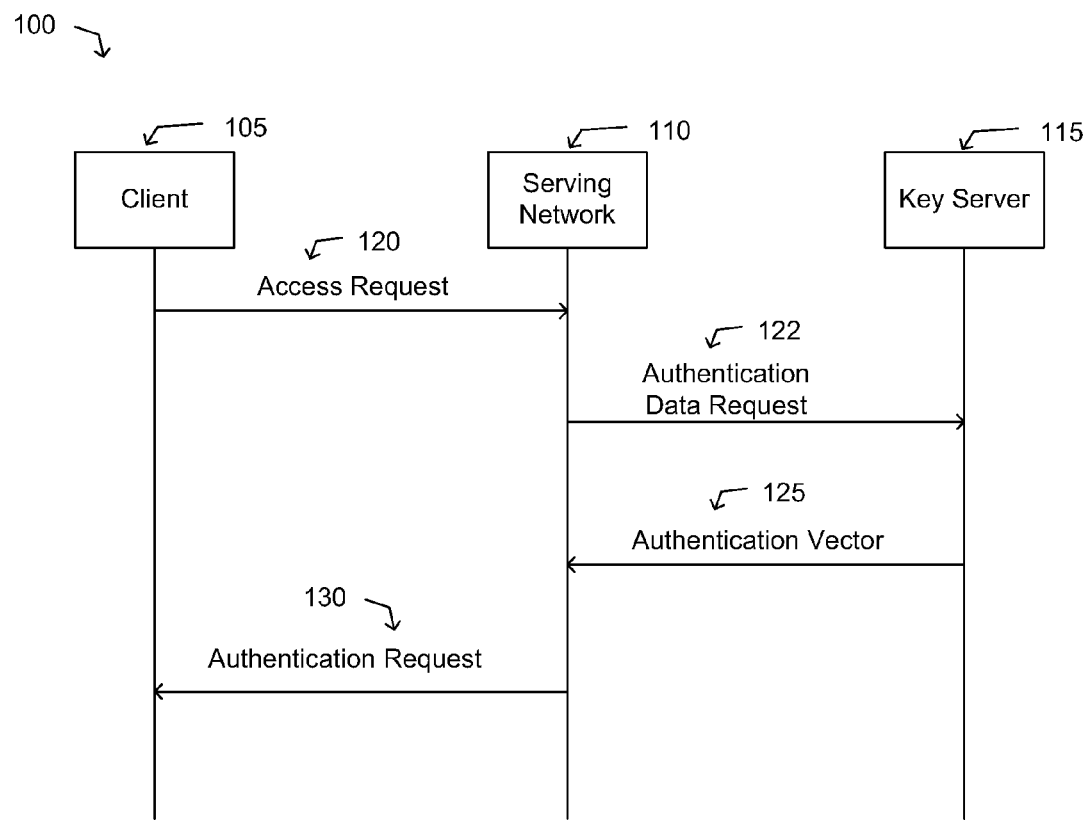
FIG. 1 is a representation of one implementation of a message flow depicting a prior art authentication and key agreement protocol.

Turning to FIG. 1, a message flow 100 in one example comprises an illustration of an AKA/EAP-AKA message flow for providing secure access channels. Henceforth, for purposes of brevity only AKA is mentioned, but all descriptions in relation to AKA apply to AKA/EAP as well. The AKA authentication protocol is a key exchange (KE) protocol that is based on certain participants in the protocol having a pre-shared or shared secret key (PSK). The main participants in the protocol are typically a communication device or client (C) 105 that requests access to a serving network (S) 110. The serving network may be a home network or the serving network may be a network the client is visiting. In the following descriptions, messages are sent to the serving network 110. In an implementation these messages may go to a home location register, a visitor location register or some other component of the serving network. Although when implemented, these messages may go to a specific node of the serving network, messages henceforth will be generically described as destined for the serving network 110. The serving network 110 typically interacts with the client (105), and a key server (KS) 115. The key server 115 typically resides in the client's (105) home network.

When the client 105 accesses the network 110, the client 105 may send an access request 120 to the serving network 110. The access request 120 may result from powering up a client device (mobile communications device), a request to burst data, or any other reason that the client 105 may want to establish a connection with the serving network 110. The client 105 and the key server 115 generate an integrity key (IK) and a cipher key (CK) that are used in securely transferring data through the network. The IK and the CK are typically generated using the shared secret key. The shared secret key is not passed over the air to the serving network 110; instead, the shared secret key is typically stored on the key server 115. Also, the shared secret key is not transmitted from the key server 115 to the serving network; instead the key server 115 passes an authentication vector (AV) comprising various variables to the serving network 110. The serving network 110 uses the contents of the authentication vector to authenticate the client 105 and establish a secure channel between the client 105 and the serving network 110. Thus, when the client 105 accesses the serving network 110, the serving network 110 determines where the key server 115 resides and sends an authentication data request message 122 to the key server 115.

Upon receipt of the authentication data request 122 the key server 115 may look up the shared secret key based on the identity of the client 105 and determine the values to be used in the authentication vector. In an embodiment the authentication vector may comprise a concatenation of a random nonce (RAND), an expected response (XRES), a CK, an IK and an authentication token (AUTN). To arrive at these values, the key server 115 may employ pseudorandom functions $f_1$ through $f_5$. These functions can either be different pseudorandom functions, or a same function such as AES. In the latter case, a function-unique argument must be prepended when a function call is made. Thus, for example, $f_i(x)$=AES (i,x). Herein, a pseudo-random function refers to AES, a hash-function, a pseudo random function, Rijndael, or any other pseudo random function or quasi-pseudo random function.

In deriving the values comprising the AV, the RAND, a sequence number (SQN), an anonymity key (AK) and a message authentication code (MAC) may be used in computing other variables of the AV. The key server 115 may generate the RAND and SQN. The RAND may be generated using various parameters, such as, for example the SQN. The SQN may be used to keep track of one-time AVs, and to help the client 105 detect replays. The AK anonymity key is an optional parameter that is generated using $f_{5_k}$. Going forward is it assumed that AK is not used and thus $f_{5_k}$=0. An authentication management field (AMF) is also involved in computing the MAC. As one of ordinary skill in the art will readily appreciate, the AMF is typically used to select technical parameters, such as, timeout values. Given the SQN, RAND, and AMF; the MAC may be derived through the function $f_{1_k}$ where MAC=$f_{1_k}$(SQN||RAND||AMF). Note that the k in $f_{1_k}$ is the shared secret key (PSK).

Figure 2A:
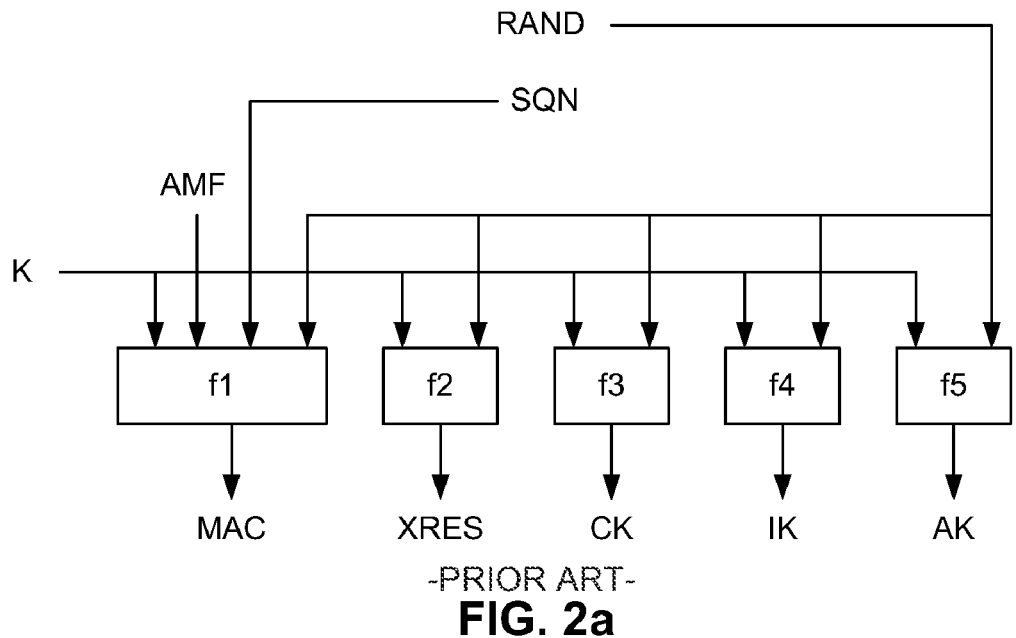
FIGS. 2A and 2B are representations of computations involved in the prior art authentication and key agreement protocol.

Still further, the XRES may be derived using $f_{2_k}$, where XRES=$f_{2_k}$(RAND). The CK may derived using $f_{3_k}$, where CK=$f_{3_k}$(RAND). The IK may be derived using $f_{4_k}$, where IK=$f_{4_k}$(RAND). The optional AK may be derived using $f_{5_k}$, where AK=$f_{5_k}$(RAND). And, AUTN=SQN⊕AK||AMF||MAC. The AV is constructed as a concatenation of the RAND, XRES, CK, IK and AUTN; thus AV=RAND||XRES||CK||IK||AUTN. See FIG. 2A for a depiction of the calculations involved at the key server 115. The AV is communicated 125 from the key server 115 to the serving network 110. Upon receipt of the AV 125, the serving network may store the CK and IK, and communicate an authentication request 130 to the client 105. The authentication request 130 may comprise the RAND and the AUTN that was calculated by the key server 115.

Figure 2B:
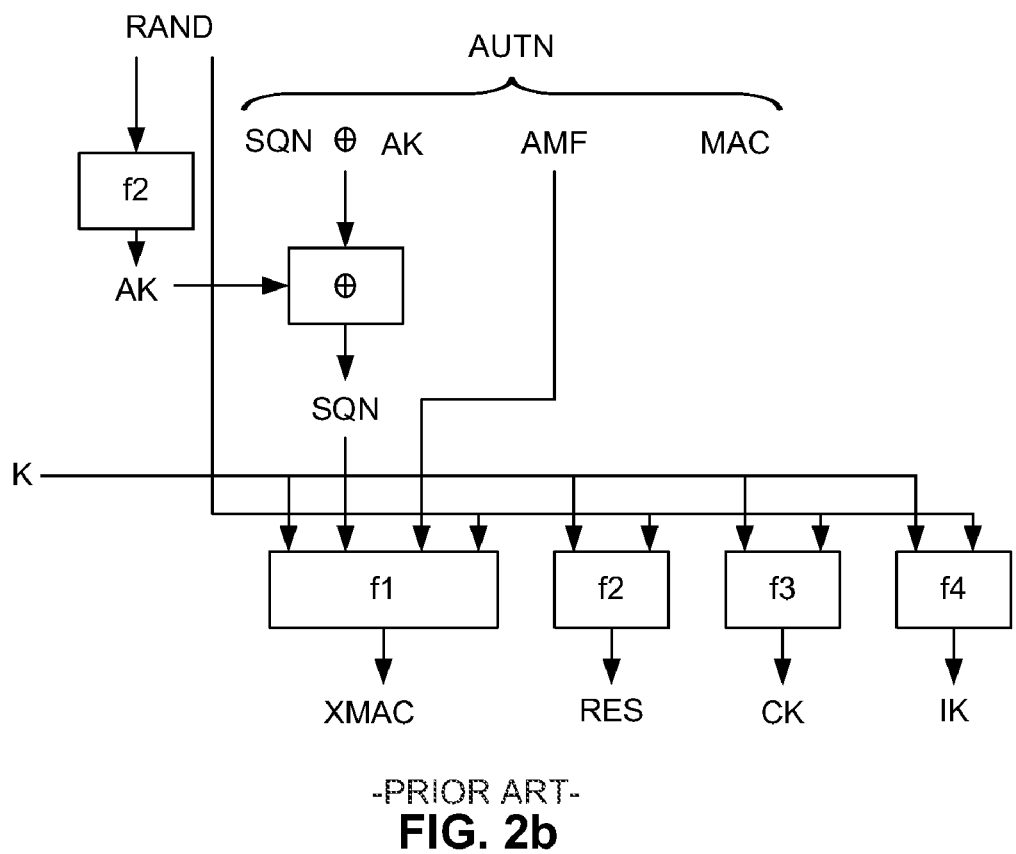

Upon receipt of the authentication request 130, the client may attempt to derive the IK and CK. The client 105 received the RAND and AUTN in the authentication request 130. Because an AK of 0 is used in this example, the AUTN=SQN||AMF||MAC. Because the client 105 is configured with the shared secret key (k) used in deriving AV, the client 105 may derive a response (RES), the CK, the IK, and an expected MAC (XMAC) as shown in FIG. 2B. The client 105 checks the validity of SQN and verifies that MAC equals XMAC. If the checks pass, the client assumes that AKA succeeded, and the client uses the derived CK and IK in secure communications with the serving network 110. The client 105 further computes and sends to the serving network 110 a response RES to the challenge. The serving network 110 verifies that RES=XRES, and if so, assumes that AKA succeeded, and uses CK and IK in the communication. This is an overview of how AKA works in conformance with the current 3rd Generation Partnership Project (3GPP) standards.

As previously described, as the number of devices that a subscriber may use to connect to a network increases, a service provider may want to issue a UIM for each of the subscriber's devices, where each UIM has the same shared secret key. It should be noted that the 3GPP standards allow for multiple UIMs with the same shared secret key. A security vulnerability, however, arises when known key exchange protocols are used in an environment where a subscriber has multiple devices, and where each device has its own UIM with the same shared secret key. Two attack scenarios that illustrate this security vulnerability are discussed.

In a first scenario, a first client (C1) and a second client (C2) attempt to connect to a serving network. Note, that C1 and C2 are devices owned by the same subscriber, yet each device has its own UIM. Thus C1 may have UIM1 and C2 may have UIM2, where UIM1 and UIM2 have the same shared secret key. As part of the key exchange protocol, the serving network may send a RAND and AUTN to C1, which an adversary (A) overhears. C2 may then attempt to establish a connection with the serving network. A, however, may block C2's communications with the serving network and repeat the overheard RAND and AUTN to C2. C1 and C2 will derive the same session keys CK and IK. C1 and C2 think that they are now securely communicating with the serving network, but both C1 and C2 are connected using the same session keys. In this scenario A may create unintended transactions on C's account. For example, if a transaction performed by C1 involves a debit on an account maintained by C1's UIM, A may replay this transaction to C2 (this is possible because C2 has the same session keys as C1). This replay may affect a corresponding debit on C2's UIM, which is clearly an unintended transaction and a successful attack.

A second attack scenario may occur if A borrows (or captures or remotely compromises) one of C's devices containing the shared secret key. The secret key is securely stored in the UIM. The session keys produced by the UIM, however, are exported into the main memory of C2. Lets assume that C2 is compromised. A then overhears the RAND and AUTN destined for C1 and forwards the RAND and AUTN to the UIM of C2. The UIM of C2 generates session keys IK and CK, and places the session keys in main memory. Note that these are the same session keys generated by C1. A is now in control of the secure session established between the serving network and C1.

One way to overcome the described vulnerability using AKA with multi-UIMs is to have the client generate and contribute randomness to the established session keys. This may be done by using the already established CK and IK as intermediate keys, and derive the session keys based on randomness sampled by a UIM. A message flow related to this proposition is depicted in FIG. 3.

Figure 3:
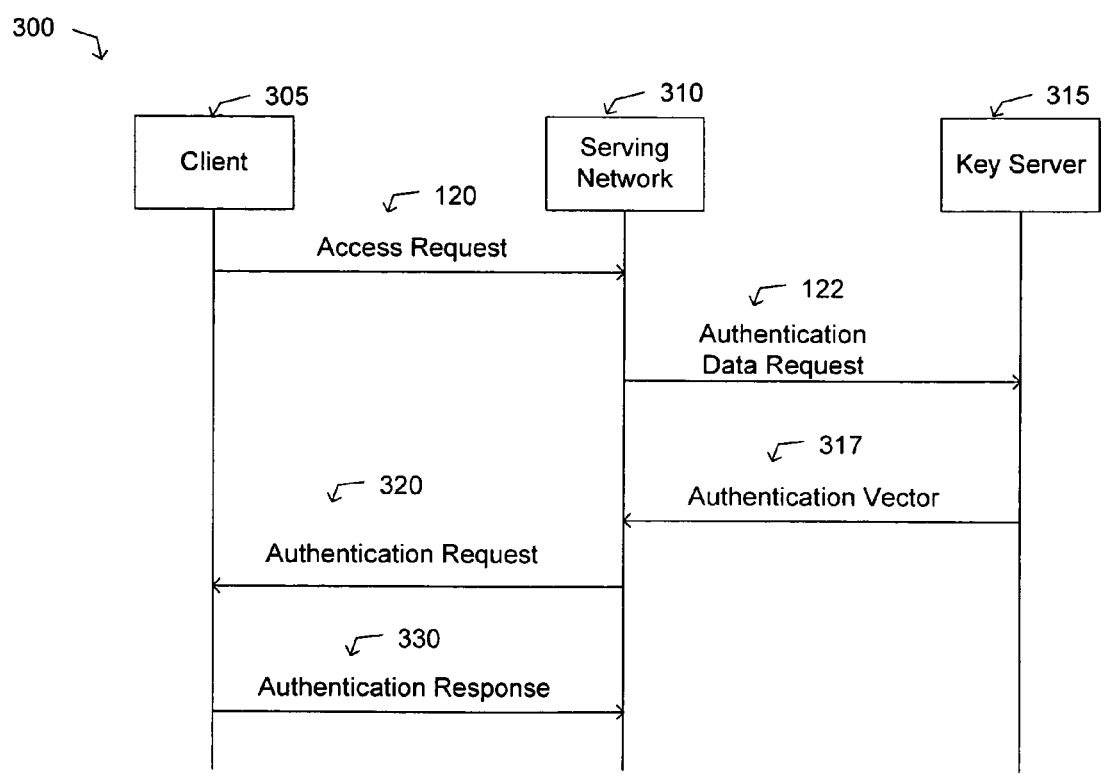
FIG. 3 is an example message flow for the secure multi-UIM authentication and key exchange protocol.

Now turning to FIG. 3, which depicts a message flow of an embodiment of a multi-UIM AKA protocol. The main participants in the message flow are a client 305, a serving network 310 and a key server 315. The client 305 may be mobile phone, a personal digital assistant, a laptop or any other type of device that may attempt to access the serving network 310. The serving network 310 is a network that the client 305 accesses, but it may or may not be the client's 305 home network. The key server 315 may reside in the client's 305 home network.

Just as in FIG. 1, the client 305 first attempts to establish a connection with the network 310 by sending the access request 120 to the serving network 310. Also just as in FIG. 1, the serving network 310 sends an authentication data request 122 to the key server 315 and the key server begins deriving information needed for the multi-UIM key exchange. In contrast to the UIM AKA protocol, the key server does not produce a CK and IK for an AV, instead the key server 315 computes a derivation key (KD) from a shared secret key and a RAND. Just as in FIG. 1, the client 305 and the key server 315 are configured with the shared key, where the shared key of the client 305 is equal to, or the same as, the shared key of the key server 315. The CK and IK may be derived from the KD. Accordingly the AV produced by the key server 315 comprises a concatenation of a RAND, AUTN and a KD (i.e., AV=RAND∥AUTN∥KD).

Pseudorandom function generators f1, F, F1 and F2 are used in computing variables needed to produce an AV 317. As previously discussed, these functions can either be different functions, or a same function such as AES. In the latter case, a function-unique argument must be prepended when the function call is made. As previously discussed, in Multi-USIM AKA, the key server 315 does not send the session keys CK and IK to the serving network 310. Instead, the key server 312 sends the serving network 310 a KD. The KD may be derived from the shared secret key and a RAND that is generated by the key server 315; thus $KD=F_k(RAND)$. The key server 315 computes MAC as in the AKA protocol; thus, $MAC=f_{1_k}(SQN\|RAND\|AMF)$. The AMF is typically used to select technical parameters, as described in relation to FIG. 1. An XRES is omitted because the serving network 310 will compute the XRES based on the KD and a RANDC. The key server 315 also constructs the AUTN as in the AKA protocol; thus, AUTN=SQN∥AMF∥MAC. As described above, AV=RAND∥AUTN∥KD. The key server 315 then transmits the AV 317 to the serving network 310. Upon receipt of the AV 317, the serving network may store the AV 317, and, in particular, the KD. The serving network may associate a unique client identifier with the stored KD, where the unique client identifier may be a mobile identification, an electronic serial number or another other unique identifier of a communication device.

Figure 4A:
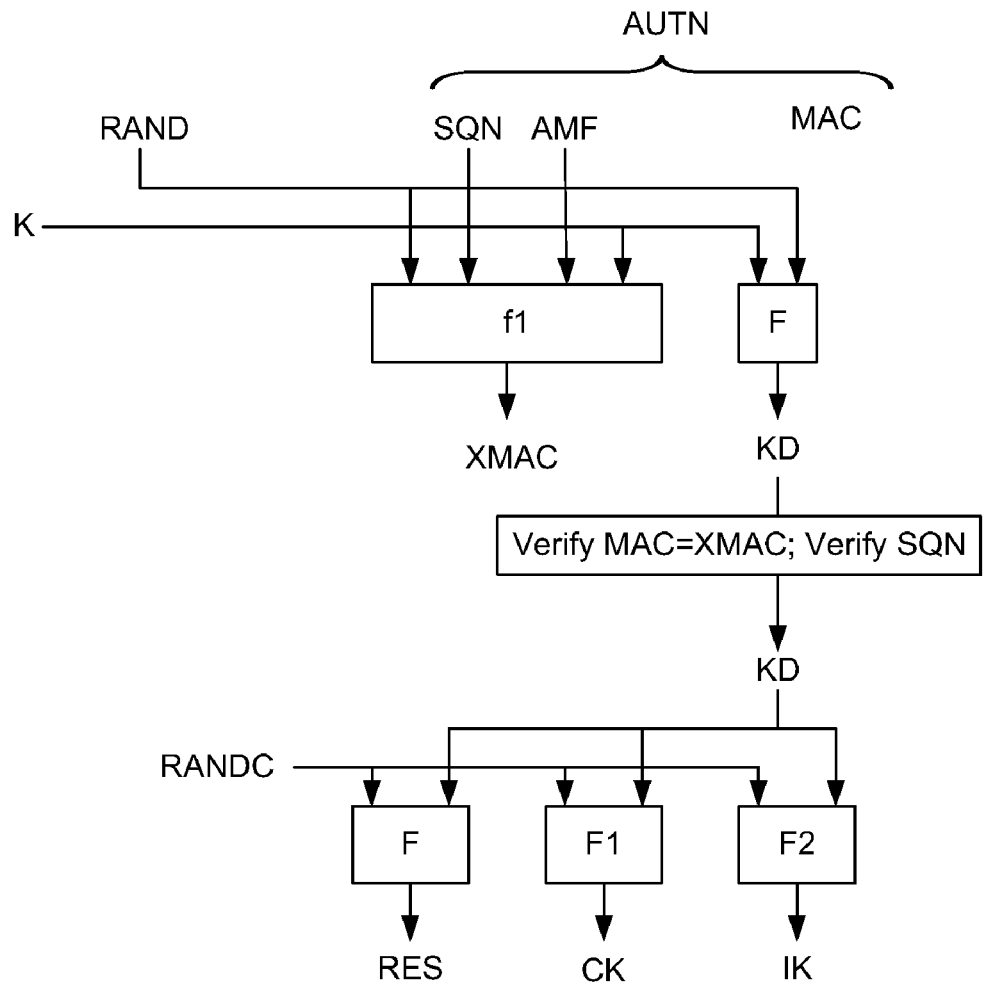
FIGS. 4A and 4B are representations of computations involved in an embodiment of the secure multi-UIM authentication key exchange protocol.

The serving network 310 sends an authentication request 320 comprising the AUTN and RAND to the client 305. The client 305 verifies the MAC and SQN comprising the AUTN just as in AKA. That is, the client 305 may determine if the MAC is equal to an expected MAC. If the MAC is verified, the client 305 computes KD, where $KD=F_k(RAND)$. The client then generates a RANDC and computes $RES=F_{KD}(RANDC)$. The client 305 may also compute CK and IK where $CK=F1_{KD}(RANDC)$ and $IK=F2_{KD}(RANDC)$. These client computations are illustrated in FIG. 4A. The client 305 now has the session keys (CK and IK) needed to conduct a secure communication session with the serving network 310. The client 305 formats and communicates an authentication response 330 to the serving network 310. The authentication response 330 may comprise the RANDC and the RES. It should be noted that these client computations occur in a UIM of the client. The shared secret key and derivation key never leave the UIM. The UIM may, however, export the session keys (CK and IK) to a memory external to the UIM where the session keys may be used in encrypting communications between the client and the serving network 310.

Figure 4B:
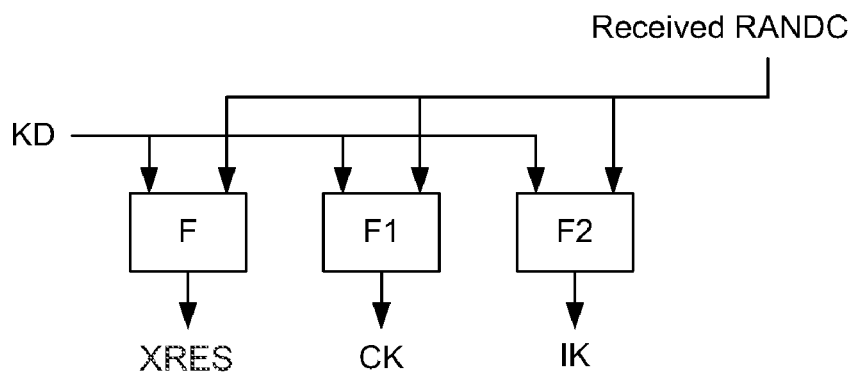

Upon receipt of the authentication response 330, the Serving Network 310 computes an expected response XRES from the KD and the RANDC where $XRES=F_{KD}(RANDC)$. The serving network may then verify that the XRES equals the RES of the authentication response 330. If the XRES is verified successfully, the serving network 310 retrieves the KD and derives the session keys CK and IK where $CK=F_{KD}(RANDC)$ and $IK=F2_{KD}(RANDC)$. The derivation of XRES, CK and IK is illustrated in FIG. 4B. The serving network 310 now has the session keys (IK and CK) that may be used to conduct a secure communication session with the client 305

Figure 5:
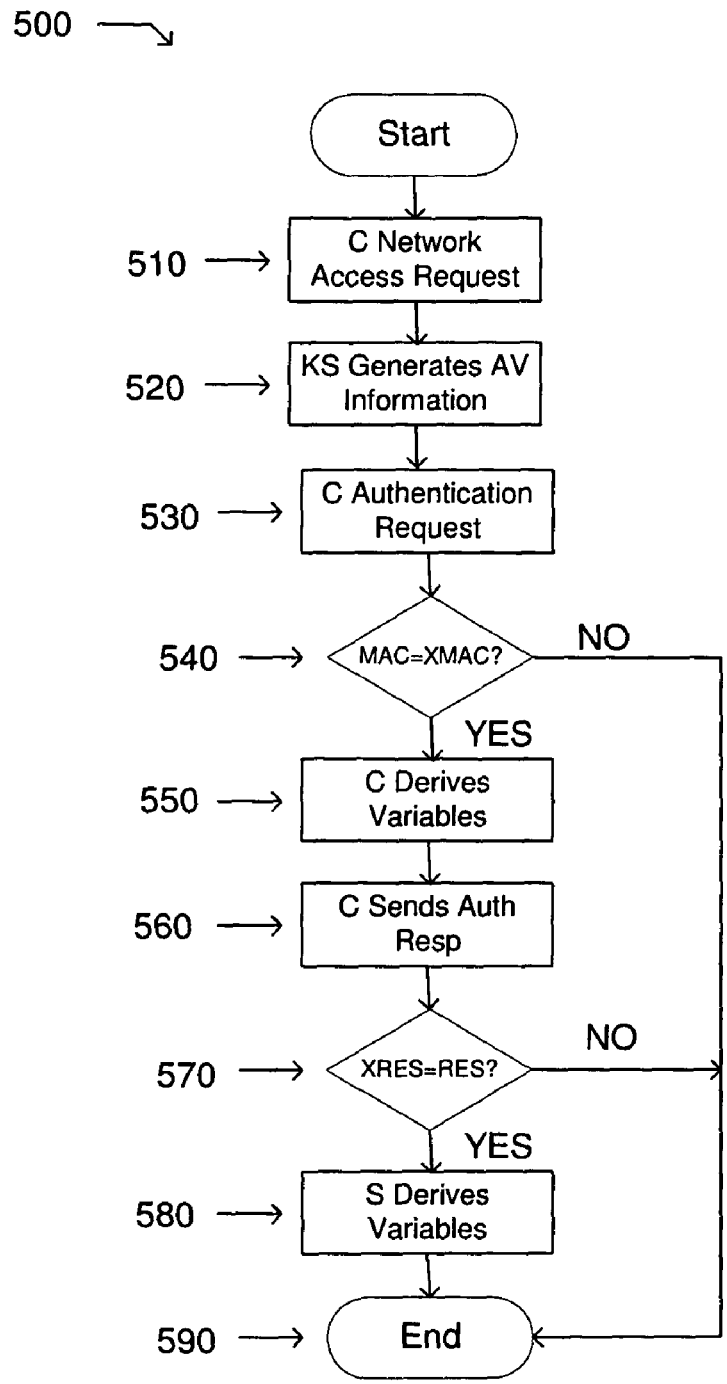
FIG. 5 is an example flow chart depicting an embodiment of the secure multi-UIM authentication key exchange method.

Turning now to FIG. 5 which is a flow-chart depicting a method 500 of the multi-UIM AKA protocol. At step 510, a client, typically a communication device comprising a UIM, requests access to a serving network. As described in relation to FIGS. 1 and 3, this may entail the client communicating an access request message to the serving network, and the serving network communicating an authentication data request to a key server. The key server responds by generating an AV and communicating the AV 520 to the serving network. The composition of the AV and how the fields of the AV are computed is disclosed in the description related to FIG. 3.

Upon the client's request for authentication, the serving network communicates an authentication request to the client 530. The authentication request may comprise a RAND and AUTN. As described in relation to FIG. 3, the client may verify that the MAC equals the XMAC 540. If the MAC does not equal the XMAC the method ends 590. If the MAC equals the XMAC, the client derives further variables needed in Multi-USIM AKA 550. Step 550, may further comprise the client generating a RANDC and computing a RES, CK and IK. The way the client generates the RANDC and computes RES, Ck and IK, is described in relation to FIG. 3.

The client communicates an authentication response 560 to the serving network. The authentication response may comprise a RANDC and a RES. The serving network may compute XRES, as described in relation to FIG. 3, and determine if the XRES equals the RES 570. If RES does not equal XRES the method 500 ends 590. If the XRES equals RES, further variables needed for Multi-USIM AKA are derived 580. In step 580, the serving network computes IK and CK as described in relation to FIG. 3. At this point, the serving network and the client have IK and CK, which may be used in secure communications between the serving network and the client.

The apparatus associated with the message flow 500 in one example comprises a plurality of components such as one or more of electronic components, hardware components, and computer software components. A number of such components can be combined or divided in the apparatus. An example component of the apparatus employs and/or comprises a set and/or series of computer instructions written in or implemented with any of a number of programming languages, as will be appreciated by those skilled in the art. The apparatus in one example comprises any (e.g., horizontal, oblique, or vertical) orientation, with the description and figures herein illustrating one example orientation of the apparatus, for explanatory purposes.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

I claim:

1. An apparatus, comprising:
a communication device component that performs an authentication key agreement protocol by receiving a first random nonce (RAND) and an authentication token, wherein the communication device component is configured with a shared secret key,
wherein the communication device component generates a derivation key by applying a first pseudo random function to the RAND and the shared secret key, and wherein the communication device component generates a first set of session keys based on a second random nonce (RANDC) received from a user identity module operatively connected with the communication device, and the derivation key where the first set of session keys are used in encrypting communications.

2. The apparatus of claim 1, wherein the first set of session keys are used in conjunction with a second set of session keys to perform secure communications, where the first set of session keys and the second set of session keys are equal.

3. The apparatus of claim 2, wherein the user identity module comprises the derivation key, the shared secret key and the first set of session keys, and the user identity module exports the first set of session keys to the communication device; and
the shared secret key and the derivation key are not exported to the communication device.

4. The apparatus of claim 1, wherein the authentication token comprises a sequence number, a first message authentication code and an authentication management field;
the user identity module computes a second message authentication code by applying a second pseudo random function to the shared secret key, the sequence number, the authentication management field and the RAND;
the user identity module compares the second message authentication code to the first message authentication code and if the first message authentication code equals the second message authentication code the user identity module derives the RANDC, the session keys and a response; and
the user identity module exports the first set of session keys, the RANDC and the response to the communication device.

5. The apparatus of claim 4, wherein deriving the RANDC, the first set of session keys and the response further comprises:
generating the RANDC;
computing the first set of session keys by applying a third pseudo random function wherein the first set of session keys comprises an integrity key and a cipher key; and
computing the response by applying a fourth pseudo random function to the RANDC and the derivation key.

6. The apparatus of claim 5, wherein:
the user identity module computes the integrity key by applying a fifth pseudo random function to the RANDC and the derivation key; and
the user identity module computes the cipher key by applying a sixth pseudo random function to the RANDC and the derivation key.

7. The apparatus of claim 4, wherein the communication device communicates the RANDC and the response to a serving network wherein the serving network generates the second set of session keys, wherein the first set of session keys and the second set of session keys are used to encrypt communications between the serving network and the communication device.

8. An apparatus, that:
receives from a client through a network node that is communicatively coupled with the client a response and a first random nonce (RANDC);
retrieves a derivation key based on a client identifier;
computes an expected response from the derivation key and the RANDC;
compares the response with the expected response and if the response equals the expected response, derives a first set of session keys, where the first set of session keys are used in conjunction with a second set of session keys to perform encrypted communications.

9. The apparatus of claim 8, wherein:
the first set of session keys and the second set of session keys are equal;
the client comprises the second set of session keys.

10. The apparatus of claim 9, wherein the first set of session keys comprises an integrity key and a cipher key where the integrity key is computed by applying a seventh pseudo random function to the RANDC and the derivation key; and
the cipher key is computed by applying an eighth pseudo random function to the RANDC and the derivation key.

11. The apparatus of claim 9, wherein:
the network node computes the expected response by applying a ninth pseudo random function to the RANDC and the derivation key; and
if the expected response equals the response, the network node derives the first set of session keys.

12. The apparatus of claim 9, wherein:
the network node is communicatively coupled with a key server;
the network node receives an authentication vector from the key server, wherein the authentication vector comprises a second random nonce (RAND), an authentication token and the derivation key;
the network node stores the derivation key;
upon request from the client, the network node communicates the RAND and the authentication token to the client; and
the client uses the RAND and the authentication token to compute the second set of session keys.

13. A method comprising the steps of:
receiving an authentication vector comprising a first random nonce (RAND), a first derivation key and an authentication token;
communicating an authentication request message where the authentication request message comprises the RAND and the authentication token;
receiving from a client a second random nonce (RANDC) and a response; and
deriving a first set of session keys based on the RANDC, and the first derivation key, where the first set of session keys is used to encrypt communications.

14. The method of claim 13 further comprising:
determining if the response equals an expected response, where the expected response is computed by applying a tenth pseudo random function to the first derivation key and the RANDC; and
deriving the first set of session keys if the expected response equals the response, where the first set of session keys comprise a cipher key and an integrity key, where the cipher key is computed by applying an eleventh pseudo random function to the first derivation key and the RANDC, and the integrity key is computed by applying a twelfth pseudo random function to the RANDC and the first derivation key.

15. The method of claim 13 further comprising:
the first derivation key is derived by applying a thirteenth pseudo random function to a first shared secret key and the RAND;
a first message authentication code is computed by applying a fourteenth pseudo random function to the first shared secret key, a sequence number, the RAND and an authentication management field;
the authentication token further comprises the sequence number, the authentication management field and the first message authentication code.

16. The method of claim 15, where the client computes a second derivation key by applying a fifteenth pseudo random function to a second shared secret key and the RAND; and
the client verifies that the first message authentication code equals a second message authentication code and if the first message authentication code equals the second message authentication code, generates the RANDC, computes the response by applying a sixteenth pseudo random function to the RANDC and the second derivation key, and computes a second set of session keys.

17. The method according to claim 16 wherein the client keeps the second derivation key in a user identity module and does not export the second derivation key from the user identity module.

18. The method according to claim 16 wherein computing the second set of session keys further comprises computing an integrity key and a cipher key, where the integrity key is computed by applying a seventeenth pseudo random function to the second derivation key and the RANDC and the cipher key is computed by applying an eighteenth pseudo random function to the second derivation key and the RANDC.

19. The method of claim 16 wherein the first derivation key equals the second derivation key.

* * * * *